(12) United States Patent
Blochmann et al.

(10) Patent No.: US 9,457,524 B2
(45) Date of Patent: Oct. 4, 2016

(54) APPARATUS FOR SHAPING PLASTICS MATERIAL PRE-FORMS INTO PLASTICS MATERIAL CONTAINERS WITH PRESSURE PADS

(75) Inventors: Erik Blochmann, Neutraubling (DE); Florian Geltinger, Donaustauf (DE); Thomas Philipp, Sinzing-Eilsbrunn (DE)

(73) Assignee: KRONES AG, Neutraubling (DE)

( * ) Notice: Subject to any disclaimer, the term of this patent is extended or adjusted under 35 U.S.C. 154(b) by 675 days.

(21) Appl. No.: 13/562,979

(22) Filed: Jul. 31, 2012

(65) Prior Publication Data

US 2013/0193624 A1    Aug. 1, 2013

(30) Foreign Application Priority Data

Aug. 19, 2011  (DE) .......................... 10 2011 052 863

(51) Int. Cl.
*B29C 49/28*    (2006.01)
*B29D 22/00*    (2006.01)
*B29C 49/42*    (2006.01)
*B29C 49/48*    (2006.01)
*B29C 49/36*    (2006.01)
*B29C 33/30*    (2006.01)
*B29C 49/06*    (2006.01)

(52) U.S. Cl.
CPC .............. *B29D 22/003* (2013.01); *B29C 49/42* (2013.01); *B29C 33/30* (2013.01); *B29C 49/06* (2013.01); *B29C 49/36* (2013.01); *B29C 2049/4856* (2013.01); *B29C 2049/4864* (2013.01)

(58) Field of Classification Search
CPC .............. B29C 2049/4856; B29C 2049/4864; B29C 2049/4866
See application file for complete search history.

(56) References Cited

U.S. PATENT DOCUMENTS

| 7,048,531 | B2 | 5/2006 | Bianchini |
| 2003/0138517 | A1 | 7/2003 | Albrecht |
| 2004/0202745 | A1 | 10/2004 | Tsau et al. |
| 2010/0156009 | A1 | 6/2010 | Voth et al. |
| 2010/0203186 | A1* | 8/2010 | Tsau ........................ B29C 33/02 425/526 |
| 2012/0091634 | A1 | 4/2012 | Meinzinger et al. |

FOREIGN PATENT DOCUMENTS

DE        102009050637 A1 * 11/2010 ............. B29C 49/28

* cited by examiner

*Primary Examiner* — James Sanders
(74) *Attorney, Agent, or Firm* — Greer, Burns & Crain, Ltd.

(57) ABSTRACT

An apparatus for forming plastic pre-forms into containers with a blow mold which has at least two movable blow mold parts which, when closed form a container-forming cavity. The first blow mold part is removably arranged on a first blow mold carrier shell part, and the second blow mold part is removably arranged on a second blow mold carrier shell part. The first blow mold carrier shell part is movable with respect to the second blow mold carrier shell part for opening the mold. A holding device holds at least one blow mold part on the respective blow mold carrier shell part. The holding device has an actuating member extending through an opening in a wall of the blow mold carrier shell part. The actuating member is movable relative to the wall, and a first holding element for holding the blow mold part is arranged on the actuating member.

18 Claims, 8 Drawing Sheets

APPARATUS FOR SHAPING PLASTICS MATERIAL PRE-FORMS INTO PLASTICS MATERIAL CONTAINERS WITH PRESSURE PADS

BACKGROUND

The present invention relates to an apparatus and a method of shaping plastics material pre-forms into plastics material containers. Apparatus and methods of this type have long been known from the prior art. In this way, it is known for example for blow moulds or blow mould parts to be arranged on carriers and for these carriers to be capable of being folded together and unfolded, in which case plastics material pre-forms are expanded to form plastics material containers in the interior of the blow mould, in particular by being acted upon with compressed air, in a closed state of this blow mould.

In this case two mould carrier shells are provided as a rule, on which the blow mould parts are arranged in a fixed manner in each case. These mould carrier shells are arranged in turn on a blow mould carrier or a blow mould carrier part respectively.

It is known in the prior art for the blow mould parts to be fastened with the aid of fixing plates. In this case these fixing plates can be designed in the manner of clamping claws, for the fastening of which a tool is generally required for clamping purposes. The screws of this clamping claw are acted upon with a torque defined in a fixed manner in order to achieve a correct clamping of the mould shell in the mould carrier shell. It is usual in this case for up to three fixing plates of this type to be necessary for clamping purposes for the left-hand and the right-hand blow mould part. The expenditure of time required for this in order to change the blow mould parts or the mould shells respectively has a direct influence upon the stoppage time.

SUMMARY

Increasing production figures are important parameters, in particular, for the customers of the plants in question here. The object of the present invention is therefore to reduce stoppage times, in particular stoppage times as a result of a change of fittings. It is a further object of the invention to provide a quick change system which may be handled without additional tools. A further object of the present invention is to achieve a simple and rapid manipulation, without a manual operation of locking means being required for this purpose.

An apparatus according to the invention for shaping plastics material pre-forms into plastics material containers has a blow mould which has at least two blow mould parts which are arranged so as to be movable with respect to each other and which in a closed state of the blow mould form a cavity, in the interior of which the plastics material pre-forms are capable of being expanded to form the plastics material containers by being acted upon with a flowable medium (and in particular a gaseous medium and in particular air), the first blow mould part being arranged in a removable manner on a first blow mould carrier shell part and the second blow mould part being arranged in a removable manner on a second blow mould carrier shell part and the first blow mould carrier shell part being movable with respect to the second blow mould carrier shell part in order to open and close the blow mould.

According to the invention the holding device has an actuating member which extends through an opening formed in a wall of the blow mould carrier shell part, wherein this actuating member is movable with respect to the wall and wherein a first holding element for holding the blow mould part is arranged on the actuating member.

In contrast to the prior art, in which the blow mould parts are usually clamped by the laterally movable holding claws mentioned, it is now proposed that the assembly or the holding respectively should be carried out by an actuating member which extends through the aforesaid wall of the blow mould carrier shell or the blow mould carrier shell part respectively. It would also be possible in this case for a full mould to be used. In this case the actuating member would extend through an opening in the blow mould carrier part.

In this case it is advantageous for the movement of the actuating member with respect to the wall to be capable of being produced by a flowable medium and, in particular, in a pneumatic manner. It would also be possible, however, for the movement of the actuating member to be initiated hydraulically or even by magnetic elements, for example an electromagnet. A corresponding controlled (pneumatically for example) actuation system is therefore advantageously incorporated in this system substantially completely in the blow mould carrier shell. A connection, for example a pneumatic connection, can be directly installed in the mould carrier halves by way of the blow mould carrier shell part in the case of an advantageous blow mould carrier shell part. The actuating member can be for example a piston element which, as mentioned above, is capable of being moved pneumatically. In this way, this piston or the actuating member respectively carries out the function of a clamping hook. The clamping hook constitutes a preferred embodiment of the holding element mentioned above and advantageously carries out both the task of a catch setting during the insertion of the blow mould part and, on the other hand, the task of clamping the blow mould part.

In the case of a further advantageous embodiment a connection for a flowable medium, and in particular for a gaseous medium, is provided on at least one blow mould carrier shell part.

In the case of a further advantageous embodiment the actuating member has a piston capable of being acted upon by pressure medium. In this case this piston can be arranged in a cylinder system. It is advantageous for the holding element in turn to be arranged—preferably in a fixed manner—on the aforesaid piston.

In the case of a further advantageous embodiment the opening in the wall is situated in a recess—formed in the wall—in the wall. This wall can extend outwards in this case in a radial direction of the closed blow mould. The insertion of the respective blow mould part is facilitated by this recess.

In the case of a further advantageous embodiment a second holding element, which co-operates with the first holding element in order to fasten the blow mould part to the blow mould carrier shell part, is fastened to the blow mould part. In this way, for example, a gripping element into which the aforesaid first holding element engages can be provided, for example screwed, on the blow mould part. The blow mould part is fastened to the blow mould carrier shell part by the co-operation of these two holding elements. It is advantageous in this case for the second holding element to be connected in a rigid manner to the blow mould part.

In the case of a further advantageous embodiment, in a fixed state of the blow mould part on the blow mould carrier shell part a holding element engages behind the second holding element. It is advantageous for the holding element arranged on the blow mould carrier shell part to engage behind the holding element arranged on the blow mould part.

In the case of a further advantageous embodiment the second holding element projects with respect to a wall of the blow mould part. In this way, the second holding element can be arranged for example on a carrier and a portion of the carrier can project with respect to the aforesaid wall of the blow mould part. This projecting portion can engage in this case in the above-mentioned recess in the wall of the blow mould carrier shell part.

In this way it is possible for the holding element mentioned above or another projection to protrude into the recess, in which case, however, reversed embodiments are also possible. It is advantageous for a relative movement of the blow mould part with respect to the blow mould carrier shell parts to be possible only in a loosened state of the holding device, but not in a state fastened or mounted in a fixed manner. It is advantageous for this relative movement to be a rotational movement of the blow mould part relative to a pre-set axis of rotation with respect to the blow mould carrier shell part. In the case of a further advantageous embodiment a holding means for a blow mould carrier is also provided on the blow mould carrier shell part.

In the case of a further advantageous embodiment a relative movement of a blow mould part with respect to the blow mould carrier shell part holding this blow mould part is made possible in at least one state despite the engagement of the holding elements one in the other. In this way, it is possible, in order to insert the blow mould part, for this blow mould part first to be pressed against the blow mould carrier part and then to be moved in this pressed-on state in order to reach a pre-set end position.

In the case of a further advantageous embodiment at least one blow mould carrier shell part is arranged on a blow mould carrier part and a pressure pad arrangement is arranged between the blow mould carrier part and the blow mould carrier shell part. By means of this pressure pad arrangement the two blow mould parts can be pressed against each other during the expansion procedure and, in this way, a contour of the containers can be improved.

The present invention further relates to a method of fastening blow mould parts on blow mould carrier shell parts, the blow mould part being arranged in a pre-set positioning on the blow mould carrier shell part.

According to the invention after the blow mould part has been applied to the blow mould carrier shell part it is moved with respect to the blow mould carrier shell part in such a way that a first holding element arranged on the blow mould carrier shell part and a second holding element arranged on the blow mould part engage with each other. After that, the first holding element arranged on the blow mould carrier shell part is moved in a further direction in order to lock the blow mould part on the blow mould carrier shells, the movement of the first holding element being produced by an actuating member which extends at least in part through a wall of the blow mould carrier shell part.

In contrast to the prior art a changed procedure for fastening the blow mould part to the blow mould carrier shell part is therefore also proposed. In this way, it is possible for the blow mould part first to be applied to the blow mould carrier shell part and then to be rotated with respect to the latter. Only in this rotated state the blow mould part is locked in a fixed manner by the aforesaid actuating member.

It is advantageous for the actuating member to be actuated by a flowable, in particular gaseous, medium and, in a particularly preferred manner, pneumatically. When use is made of a pneumatic actuation it is advantageous to be able to control the supply with compressed air to reduce pressure in order to move the actuating member by way of an operating function of the apparatus as a whole, such as for example a blow moulding machine or a stretch blow moulding machine.

It is advantageous for a pressure pad arrangement to be arranged between at least one blow mould carrier part and the blow mould part arranged on this blow mould carrier part, a pressure chamber or a pressure pad device of this pressure pad arrangement being capable of being acted upon with a flowable pressure medium, in order to force apart from each other the at least one blow mould carrier part and the blow mould part arranged on latter by a force acting between the blow mould carrier part and the blow mould part.

It is advantageous for the pressure pad arrangement to be designed in such a way that the force acting between the blow mould carrier part and the blow mould part has a first force component which acts in a first pre-set region—preferably capable of being spatially defined or bounded respectively—and preferably capable of being spatially defined or bounded respectively—in the peripheral direction of the blow mould part and a second force component which acts in a second pre-set region in the peripheral direction of the blow mould part, the first region and the second region being arranged at a distance from each other and the directions of the first force component and the second force component extending at an angle different from 0 degrees with respect to each other. The pre-set regions in which the force components act thus preferably result from a shape—in particular geometrical—of the pressure pad arrangement.

The arrangement of the blow mould part on the blow mould carrier part is to be understood as being that this blow mould part is arranged at least indirectly, i.e. optionally for further elements on the blow mould carrier part. It is customary for the blow mould part to be arranged in turn on a blow mould carrier shell, also referred to below in brief as a carrier shell, and for this carrier shell preferably to be arranged on the blow mould carrier part, the pressure pad arrangement mentioned being formed between the blow mould carrier part and the aforesaid carrier shell. In the prior art it is usual for the blow mould carrier part and the blow mould part to have arranged between them only one uniform pressure pad which can be acted upon with compressed air. When the pressure pad is acted upon a resulting force acts accordingly in only one direction, so that the blow mould and the blow mould carrier are pressed apart in this resulting direction. In this case this only one application of force can result during the blow moulding procedure in stresses which eventually affect the shape of the plastics material container formed in this way. The flowable medium with which the pressure pad is acted upon is in particular a gaseous medium, preferably air and optionally sterile air.

On account of the procedure preferably proposed the position and design of the pressure pad are arranged in such a way that the deformation in the mould carrier and in the (mould) carrier shell is reduced. More precisely, the forces applied by the pressure pad are divided into at least two components which act upon the carrier shell or the blow mould respectively at different angles in order to reduce the risk of stresses during the expansion procedure in this way. In the case of an advantageous embodiment the two force components are independent of each other and, in particular, are preferably also capable of being set—in particular with respect to their magnitudes—independently of each other.

It is preferable for no force (apart from a force formed vectorially from the force components), or only a force which is considerably lower than the force components and which presses the blow mould part and the blow mould carrier part apart from each other, to act in the peripheral direction between the two regions, at least locally.

In the case of an advantageous embodiment the apparatus for shaping plastics material pre-forms also has a stressing device which acts upon the plastics material pre-forms with a gaseous medium and, in particular, with compressed air during the expansion procedure in order to expand them.

In addition, the apparatus preferably also has a stretch bar which stretches the plastics material pre-forms in their longitudinal direction during the expansion procedure.

In the case of a further advantageous embodiment a locking device is also provided which locks the mould carrier parts together in particular during the expansion procedure. In this case this locking can engage in a cam-controlled manner and can be arranged in such a way that the two mould carrier parts are locked together at the beginning of the expansion procedure and also in the course of the expansion procedure. As mentioned, the design with the two force components permits a more uniform pressing of the two blow mould parts against each other.

In the case of a further advantageous embodiment the apparatus has only one pressure pad arrangement of this type on one of the two mould carriers.

In the case of a further advantageous embodiment the angle between the direction of the first force component and the direction of the second force component is between 10° and 170°, preferably between 20° and 160°, preferably between 30° and 150°, preferably between 45° and 135°, preferably between 60° and 120°, and in a particularly preferred manner between 75° and 105°. These arrangements of the directions of force permit an expedient pressing of the two blow mould parts against each other in a particularly advantageous manner. In this way, in particular, the pressure pad is arranged in a V-arrangement, so that the two forces are at the aforesaid angle with respect to each other. In the case of an advantageous embodiment the carrier shell is held on the blow mould carrier part by way of a retention means with positive locking, so that a fixed position of the aforesaid pressure pad is also achieved.

In the case of a further advantageous embodiment the pressure pad arrangement has a first pressure pad device and a second pressure pad device which are separated from each other at least in part or locally respectively and are preferably separated from each other completely. On account of these aforesaid pressure pad devices the two forces mentioned above can also optionally be applied independently of each other to the blow mould or the carrier shell respectively. It would also be possible, however, for only one pressure pad device to be provided, but for this to be arranged in such a way that the two forces mentioned above are produced. This can be achieved for example by a cross member inside an individual pressure pad device, which ensures that no forces or only slight forces are exerted in the peripheral direction of the blow mould in a central region between the two force components mentioned.

An at least partial separation of the pressure pad devices is understood to be, in particular, that although these pressure pad devices can be connected to each other by way of a connecting portion, this connecting portion extends not along an entire lateral edge of at least one pressure pad device but only along a portion of such a lateral edge, which is preferably smaller than 50% of the lateral edge, preferably smaller than 30% of the lateral edge and preferably smaller than 20% of the lateral edge.

In other words, with a local separation the pressure pad devices are preferably connected to each other only by way of a connecting portion which extends over less than 20% of the periphery of at least one of the two pressure pad devices, preferably over less than 10% of the periphery and preferably over less than 5% of the periphery.

In the case of a further advantageous embodiment the apparatus has a first supply device, in order to supply the flowable medium to the first pressure pad device, and a second supply device separate from it, in order to supply the flowable medium to the second pressure pad device. In this way, a different control of the two pressure pad devices is possible. In addition, the supply ducts for the two pressure pad devices can be separated from each other completely, but it would also be possible for the flowable medium, i.e. the compressed air, to be supplied to the two pressure pad devices by way of a common connection.

In the case of a further advantageous embodiment the pressure pad arrangement has a continuous sealing device which demarcates the space acted upon with the flowable pressure medium, i.e. the pressure chamber, and this sealing device abuts against a flat wall area. In the prior art it is usual for sealing devices abutting in a three-dimensional manner to be used, i.e. in particular sealing devices which also extend along a curved portion of the carrier shell or the blow mould or blow mould carrier respectively. In this embodiment it is proposed that the sealing device should extend only along one plane, i.e. a straight plane and thus only in the two-dimensional range. In this way an improved sealing effect is possible.

In the case of a further advantageous embodiment the pressure pad arrangement is arranged between the blow mould carrier part and a carrier shell holding the blow mould part. This carrier shell can be designed in such a way in this case that the blow mould part is designed to be releasable from this carrier shell.

In the case of a further advantageous embodiment the apparatus has a holding device for holding the blow mould part on the blow mould carrier part, and this holding device is arranged in a peripheral direction of the blow mould between regions of the pressure pad arrangement. In the case of this embodiment it is proposed that an arrangement—preferably central with respect to the pressure pad arrangement—of the holding device is provided, which can be provided for example—if only one pressure pad device is provided—on a corresponding bounding cross member.

It is preferable, however, for the holding device to be arranged between the first pressure pad device and the second pressure pad device. It is preferable for a force not to be exerted in the direction of the blow mould by the pressure pad itself in a region of this holding device.

An advantageous method of shaping plastics material pre-forms into plastics material containers is also described, in which a blow mould is provided which has two blow mould parts which are arranged so as to be movable with respect to each other and which in a closed state of the blow mould form a cavity, in the interior of which the plastics material pre-forms are expanded to form the plastics material containers by being acted upon with a flowable medium and, in particular, with compressed air.

In this case the first blow mould part is arranged on a first blow mould carrier part and the second blow mould part is arranged on a second blow mould carrier part. The first blow mould carrier part is moved with respect to the second blow mould carrier part in order to open and close the blow mould. In addition, a pressure pad arrangement is arranged between at least one blow mould carrier part on the blow mould part arranged (at least indirectly) on this blow mould carrier part, a pressure chamber or a pressure device of this pressure pad arrangement being acted upon with a flowable pressure medium in order to move apart the at least one blow mould carrier part and the blow mould part arranged on the latter by a force acting between the blow mould carrier part and the blow mould part.

It is advantageous for the pressure pad arrangement to be designed in such a way that the force acting between the blow mould carrier part and the blow mould part has a first force component, which acts in a first pre-set region in the peripheral direction of the blow mould part, and a second force component, which acts in a second pre-set region in the peripheral direction of the blow mould part, the first region and the second region being arranged at a distance from each other and the directions of the first force component and the second force component extending at an angle different from 0 degrees with respect to each other.

It is therefore proposed in terms of the method that the pressure pad arrangement should be designed in such a way that at least two force components are provided which act upon the blow mould part or a carrier shell holding the blow mould part respectively.

In the case of a preferred method a holding force acting between the blow mould part and the blow mould carrier part acts in the peripheral direction of the blow mould between the first force component and the second force component.

BRIEF DESCRIPTION OF THE DRAWINGS

Further advantages and embodiments are evident from the accompanying drawings. In the drawings.

DETAILED DESCRIPTION

Figure 1:
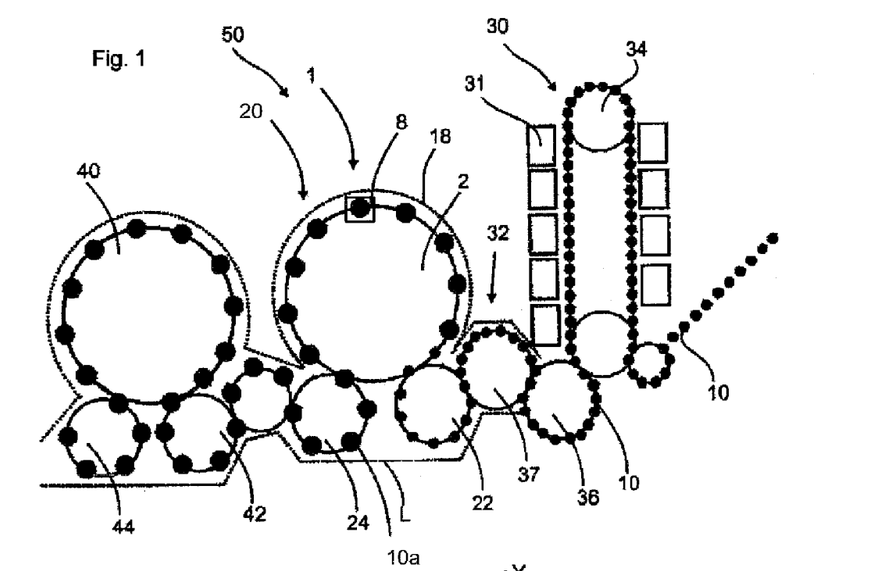
FIG. 1 shows a treatment plant for containers according to the prior art.

FIG. 1 is a diagrammatic illustration of a plant for producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31. This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation is possible for example in this region. In particular, an internal sterilization of the pre-forms is carried out in this region.

The reference number 20 designates in its entirety a clean room, the external boundaries of which are indicated here by the dotted line L. In a further preferred embodiment the clean room 20 is not only arranged in the region of the conveying wheel 2 and the filling device 40, but it already starts if possible in the region of the heating device 30, the sterilization device 32, the supply of the plastics material pre-forms and/or the production of the plastics material pre-forms.

It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way the volume of the clean room can be reduced.

The reference number 1 designates a shaping apparatus as a whole, in which a plurality of blow moulding stations or shaping stations 8 are arranged on a conveying wheel 2, only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10a from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 6 [sic], but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition, a lower outlay is required in order to keep the system sterile in the operative phase. Less sterile air is also necessary, and this leads to smaller filter units and the risk of uncontrolled swirl formation is also reduced.

Figure 2:
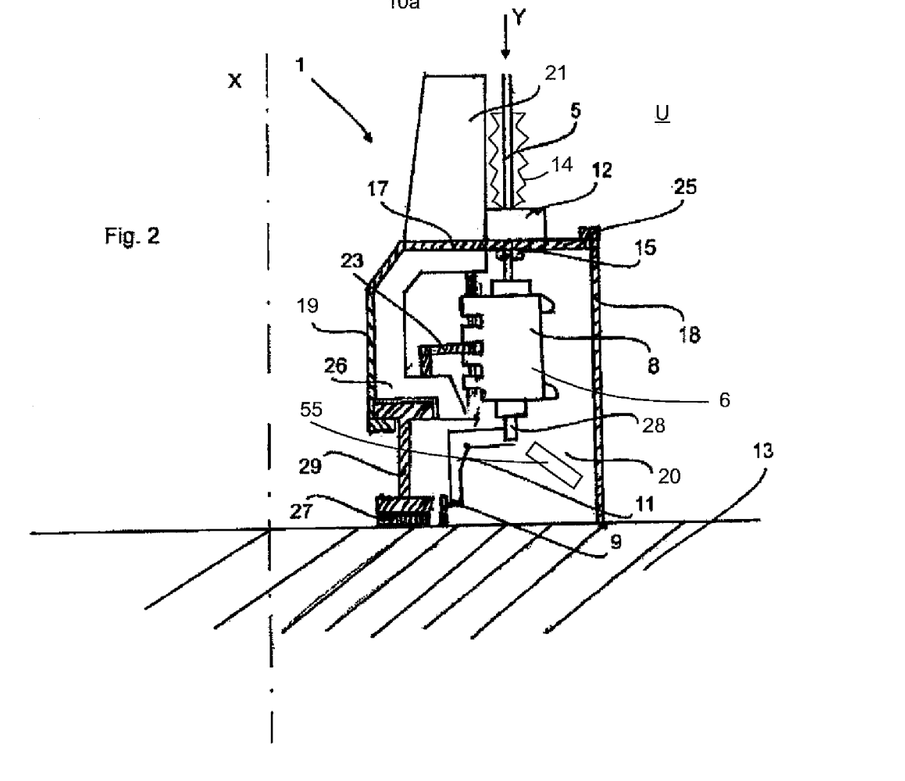
FIG. 2 is an illustration of a blow moulding station according to the prior art.

FIG. 2 is a detailed illustration of the apparatus 1 in the region of a blow moulding station 8. A plurality of blow moulding stations 8 of this type are moved by a conveying device 2 or a carrier so as to rotate about an axis X. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 16. Here, this wall 18 is a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 6, in order in particular to introduce the plastics material pre-form into the blow moulding station and also to remove it again. In this case a guide cam 9 is also arranged inside the clean room 20. It would also be possible, however, for example for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows to be provided outside the clean room 20 or above the slide 12, the folding bellows surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould 4. This carrier is likewise movable in the direction Y in this case.

The reference number 55 relates to a sterilization device which in this case is preferably arranged in the interior of the clean room 20 and is used for the sterilization of the individual shaping stations or components of these shaping stations 8. This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it is advantageous for sterile air to be introduced into the clean room 20 in order to sterilize the clean room 20 by way of the aeration system.

The blow moulds (not shown) are arranged inside the blow mould carriers 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It would also, however, be possible and preferred (other than as shown in FIG. 2) for the conveying device 2 or the carrier to have a C-shaped external periphery which also forms the outer walls of the clean room in part. In this way, this C-shaped clean room wall turns with the conveying device 2, i.e. the blowing wheel. In this embodiment the lower boundary of the clean room is arranged at a distance from the floor 13 and moves relative to the floor. In this way, the clean room can be made even smaller than as shown in FIG. 2. In this case it is preferable for this C-shaped profile of the conveying device, which forms both an inner wall and a lower and upper cover of the clean room here, to be sealed off only with respect to the outer wall of the clean room. This outer wall is preferably arranged in a stationary manner in this case.

The arrangement shown in FIGS. 1 and 2 relates to a sterile blow mould arrangement. The present invention, however, is capable of being applied equally well in the case of conventional or non-sterile blow moulding machines. In addition, the plant concept shown in FIG. 1 is capable of being applied both for sterile machines and for non-sterile machines.

Figure 3A:
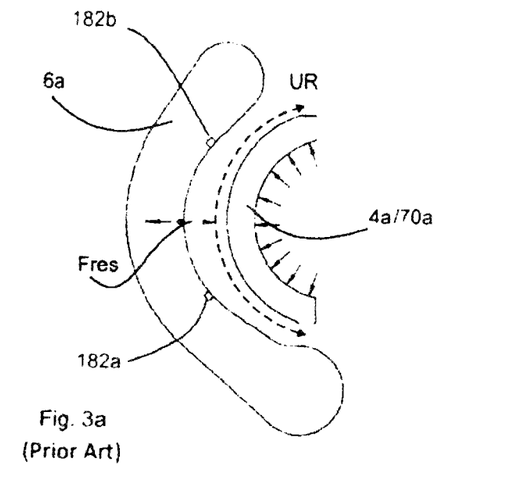
FIG. 3a is a diagrammatic illustration of a blow mould apparatus of the prior art.
Figure 3B:
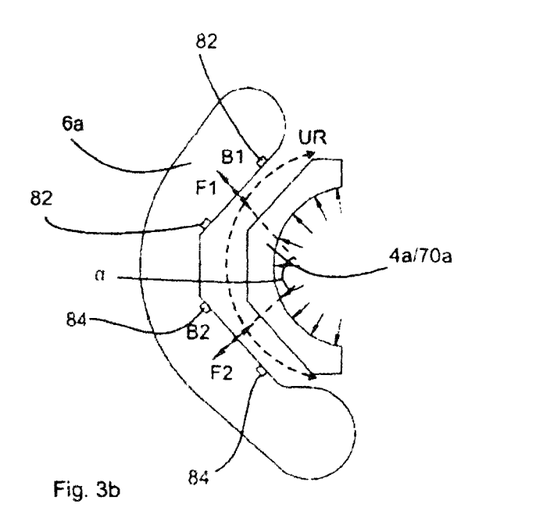
FIG. 3b is a diagrammatic illustration of a blow mould apparatus of the invention.

FIGS. 3*a* and 3*b* are two diagrammatic illustrations to explain the problem underlying the invention and its solution. FIG. 3*a* shows the relationships according to the prior art. In this case a blow mould carrier unit 6*a*, on which a blow mould 4*a* is arranged (optionally by way of a carrier shell), is provided here. It would also be possible, however, for the blow moulds to be fastened directly to the carrier. A pressure pad, which is provided in the peripheral direction UR and which is formed between the two seal portions 182*a* and 182*b*, is arranged between the blow mould carrier 6*a* and the blow mould 4*a*. This pressure pad thus produces a resulting force Fres which acts horizontally here. The small force arrows in the interior of the blow moulds relate to the forces which arise on account of the actual blow moulding procedure. This means that in this way stresses and also deformation of the blow mould or even the blow mould carrier shell can occur in this way.

FIG. 3*b* shows an arrangement according to the invention. In contrast to the prior art two pressure pads are provided here, which are arranged at a distance from each other by the continuous seals 82, 84 and which exert force components F1 and F2, which are orientated at the pre-set angle with respect to each other, upon the blow mould 4*a* or the carrier shell for the blow mould respectively. The reference numbers 82, 84 thus designate sealing devices which surround or form the two pressure pads. On account of the action with two force components F1 and F2, a force effect which is more uniform as a whole can be exerted upon the blow mould 4*a* or the carrier shell respectively. These two regions B1 and B2 in which the force components act are arranged at a distance from each other here in the peripheral direction UR of the blow mould. The angle α at which the two forces F1 and F2 extend with respect to each other is preferably in a range of between 70° and 110°.

The peripheral direction is advantageously also a peripheral direction of the plastics material pre-form to be expanded or the plastics material container respectively. The angle α mentioned is advantageously formed in a plane formed by the peripheral direction. This plane is advantageously at a right angle in this case to a longitudinal direction of the plastics material pre-form and is advantageously parallel to the plane of FIG. 3*b*.

Figure 4:
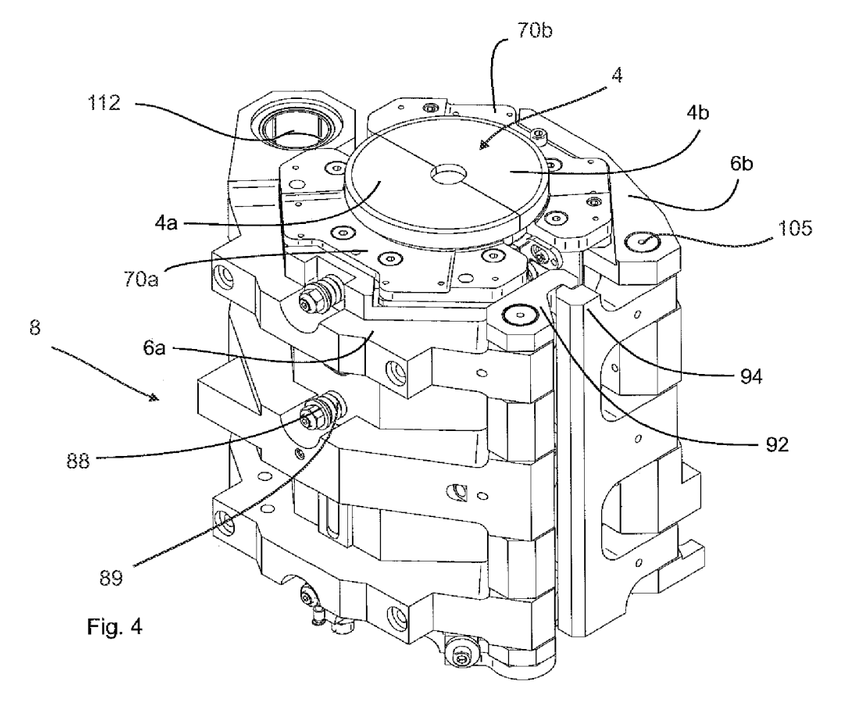
FIG. 4 shows a blow moulding station according to the invention for shaping plastics material pre-forms into plastics material containers.

FIG. 4 is a perspective illustration of a blow moulding station 8 according to the invention. In this case this blow moulding station 8 has two blow mould parts 4*a*, 4*b* which are shown in a closed state here. The cavity mentioned above, inside which the plastics material pre-forms are expanded to form the plastics material containers, is formed between these two blow mould parts 4*a*, 4*b*.

The blow mould part 4*a* and accordingly also the blow mould part 4*b* are arranged in a fixed manner, for example clamped or screwed, on blow mould carrier shell parts 70*a*, 70*b*. These blow mould carrier shells 70*a*, 70*b* are in turn arranged on blow mould carrier parts 6*a* and 6*b*. These blow mould carrier parts are pivotable with respect to a common pivot mounting 112, in order to open and close the blow mould.

The reference number 92 relates to a first locking element into which a second locking element 94 for locking the blow mould during the expansion procedure engages. For this purpose this second locking element 94 is pivotable with respect to a pivot shaft 105.

The reference number 88 relates to fastening means or holding devices respectively, which are used for fastening the blow mould carrier shells 70*a* and 70*b* to the respective blow mould carrier parts 6*a*, 6*b*.

The compressed air for operating the pressure pad is provided by way of supply means. A locking element is used for the rapid locking and unlocking of the blow mould carrier shells 70*a* and 70*b* with respect to the associated blow mould carrier parts 6*a* and 6*b*.

Figure 5:
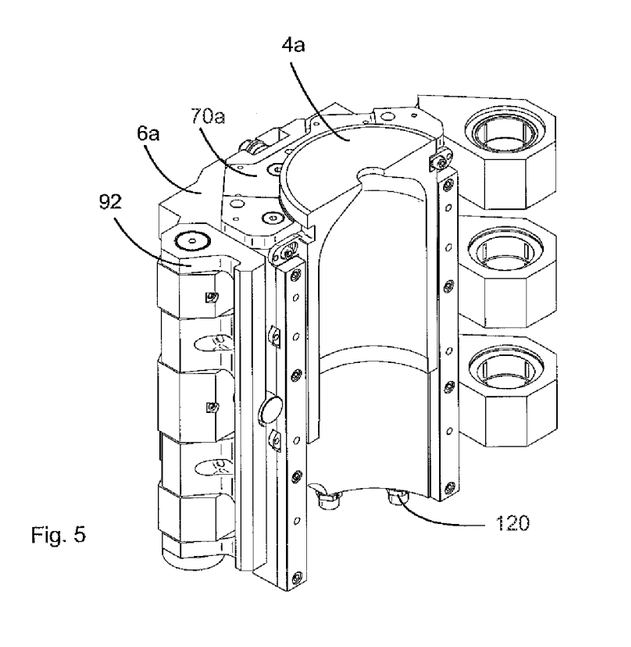
FIG. 5 is a partial view of a blow moulding station for shaping plastics material pre-forms into plastics material containers.

FIG. 5 is a part illustration of the apparatus shown in FIG. 4, i.e. a blow mould carrier part 6*a* with the blow mould shell part arranged in it and the blow mould part 4*a*. In addition, an attachment 120, by way of which a tempering medium, for example a heated liquid, can be supplied to the blow mould part 4*a*, is evident here.

Figure 6:
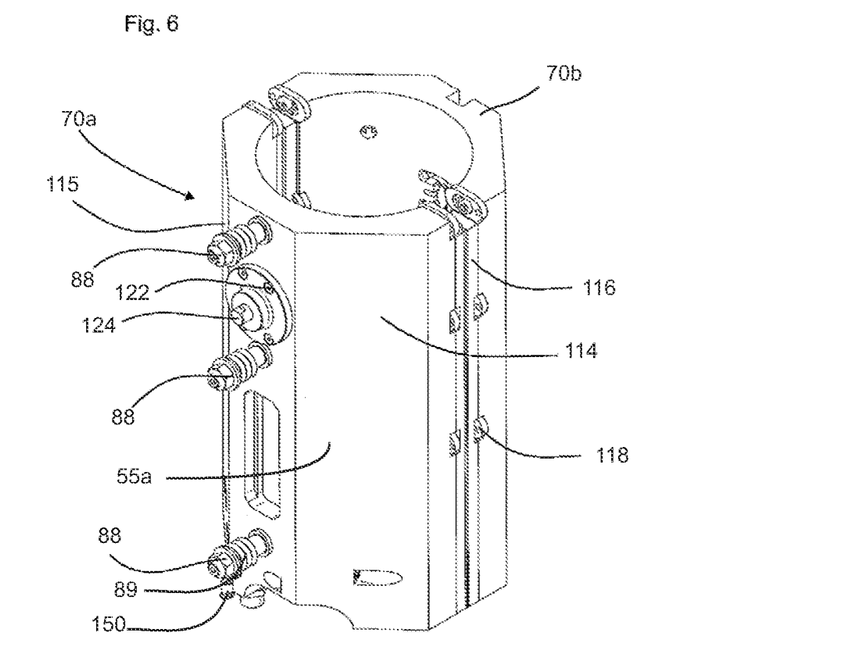
FIG. 6 is an illustration of a carrier shell for carrying blow moulds.

FIG. 6 is an illustration of the blow mould carrier shells 70*a*, 70*b*. It is evident that they have a polygonal external periphery here, i.e. the two carrier shell parts 70*a* and 70*b* have four edges in each case on their outer faces. The reference numbers 114 and 115 relate to faces of the blow mould carrier shells which are stressed by the pressure pad (not shown) during operation. The corresponding forces exerted by the pressure pads act substantially at a right angle to the two faces 114 and 115. The pressure pads are therefore also bounded by the faces 114, 115 or portions of these faces respectively. The faces are flat or respectively two-dimensional here. The sealing devices 82 and 84 abut against these faces.

The reference number 116 relates to a holding element by which the blow mould parts (not shown) are held on the blow mould carrier shells 70*a*, 70*b*. The reference number 118 designates an engagement means, such as a claw, which holds the blow mould parts in a closed state. It is advantageous in this case for this engagement means to be pivotable, so that the blow mould parts can be uncoupled from the carrier shells by way of this pivoting procedure.

The fastening means 88, by which the blow mould carrier shells can be arranged on the blow mould carriers, are again likewise evident here. These fastening devices are arranged in this case between the two faces 115 and 114 and thus between those areas in which the respective force components F1 and F2 are applied in operation. A pressure pad is not applied to the second blow mould shell part 70*b* in operation, i.e. the pressure pad is applied only to one of the two blow mould carrier shell parts here. This is also sufficient, however, to force the two blow mould parts towards each other.

Figure 7:
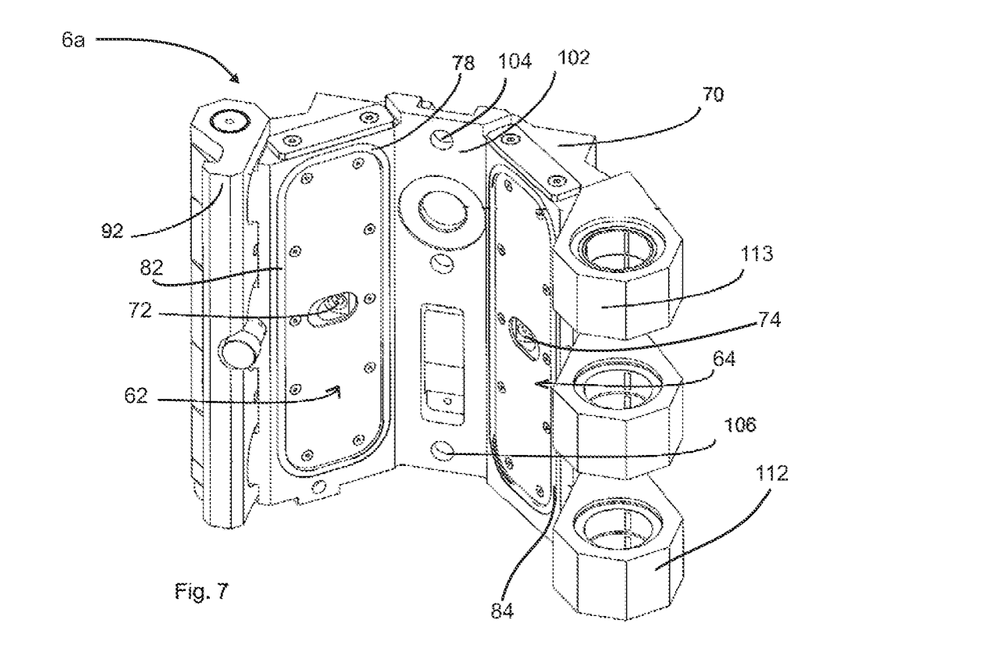
FIG. 7 is an illustration of a blow mould carrier part according to the invention.

FIG. 7 is a further illustration of a blow mould carrier part 6*a*. In this case the sealing devices 82, 84 are evident which form or bound the two pressure pad devices 62, 64 in each case here. The reference number 102 in turn designates the area which is arranged between these two pressure pads and which is used for fastening the mould carrier shell part on the blow mould carrier part 6*a*. The sealing devices 82, 84 are here, as mentioned above, arranged in a flat region and are thus made two-dimensional, which is easier to produce than a three-dimensional shape, which extends for example on a curved wall.

The reference numbers 72, 74 designate in each case supply devices, by means of which the area which is surrounded by the sealing device 82 and which thus forms the pressure pads 62, 64, is acted upon with compressed air, in order to press apart the blow mould carrier shell part and the blow mould carrier part 6*a* in this way. The reference numbers 104 and 106 relate to through-openings through which the fastening means 88 are capable of extending. The reference number 113 in turn designates a suspension means to which the blow mould carrier part 6*a* is articulated, in order to be pivotable in this way. The fastening means can have spring devices 89 which produce a clamping force which draw the mould carrier shell 70*a* and the blow mould carrier part 6*a* together.

Figure 8:
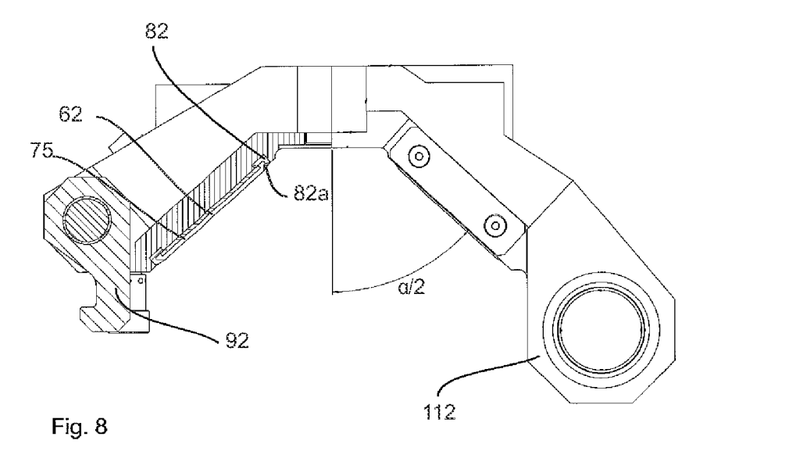
FIG. 8 is a plan view of the blow mould carrier part shown in FIG. 7.

FIG. 8 is a top view of the apparatus shown in FIG. 7. The reference number 82 in turn designates the sealing device and the reference number 75 a holding device by which the sealing device is held on the blow mould carrier part. This holding device 75 can be for example a plate which is screwed to the blow mould carrier part 6a by one or more screws and which clamps a portion of the continuous sealing device 82. A portion 82a (likewise continuous) of the sealing device 82 abuts against the blow mould carrier shell (not shown). The sealing devices are advantageously produced from an elastomer and preferably extend in one plane.

The reference α/2 designates the angle which is formed between the right-hand pressure pad and a perpendicular bisector. The total angle between these two pressure angles accordingly corresponds to that of the angle α.

In this way, the pressure pads have been divided into two equal parts and put into a V-shaped arrangement at an optimum angle. In addition, the fastening means 88 or the holding means with positive locking mentioned above provide or provides a fixed position of the now simplified two-dimensional seal 82. More precisely, this fixed position can be produced by the holding device 75 which can be for example a plate.

Figure 9:
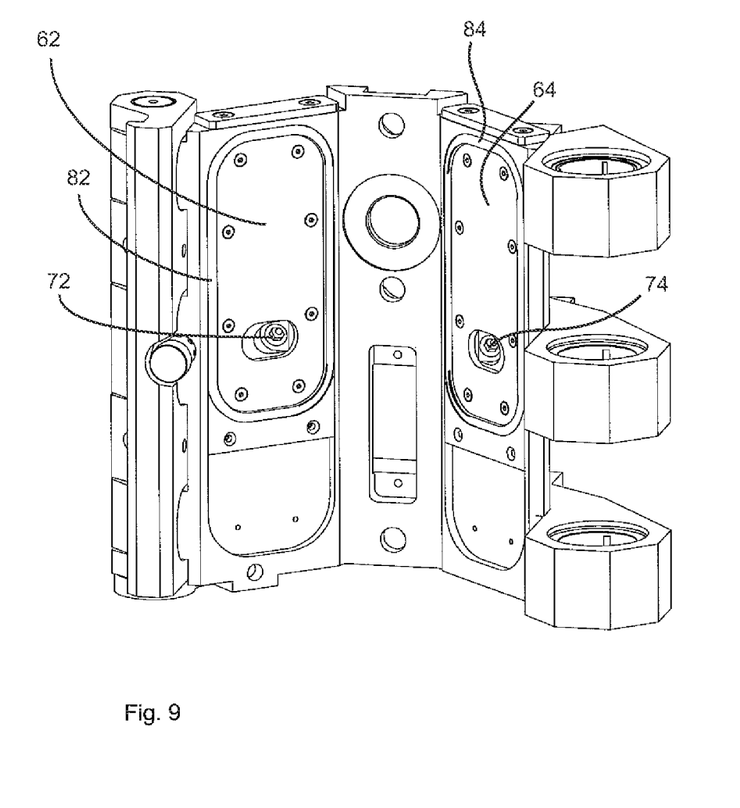
FIG. 9 is a further view of a blow mould carrier part according to the invention.

FIG. 9 shows a further embodiment of the apparatus according to the invention. It is evident that here the area surrounded by the sealing device 82 is reduced and thus also the pressure pad 62. The area of the pressure pad has thus been altered by the change of the sealing device 82 and, in this way, it is possible for the position of the application of force upon the blow mould carrier shells and also the magnitude of the force to be controlled in a purposeful manner. If desired, cross members could also extend through the respective pressure pad devices 62, in order to split the forces still further.

Figure 10:
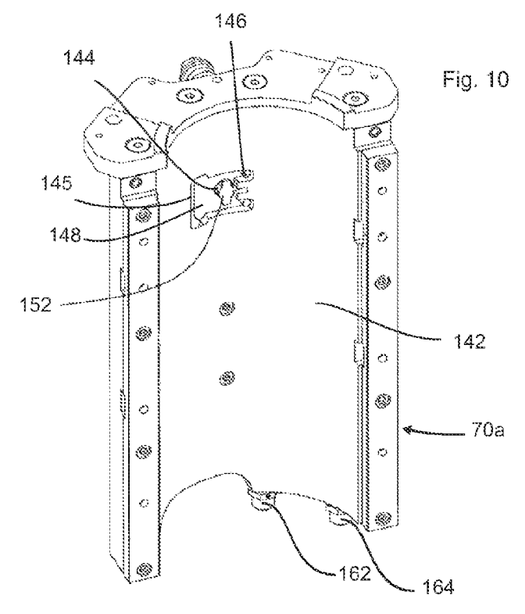
FIG. 10 is a first illustration of a blow mould carrier shell part.
Figure 12:
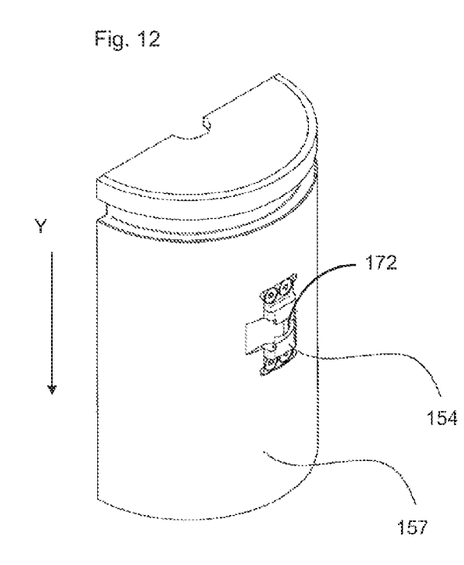
FIG. 12 is an illustration of a blow mould part.

FIG. 10 is an illustration of a blow mould carrier shell part 70a. This blow mould carrier shell part 70a is used for receiving a blow mould part. To this end the blow mould carrier shell part 70a has an inner wall 142 in which a visible (only in part) opening 144 is provided. An actuating member 140, which is likewise visible only in part and on which a first holding element 152 is arranged, extends through this opening 144. In this case the aforesaid opening 144 is formed inside a recess 148. The reference number 145 designates a sloping face which facilitates the insertion of a blow mould part, as shown in FIG. 12. The reference numbers 162 and 164 designate connections in order to supply a tempering medium to the blow mould carrier shell part. The actuating member 140 can be moved by a pneumatic means, for example with compressed air, by way of the pneumatic connection 150 shown in FIG. 6.

Figure 11:
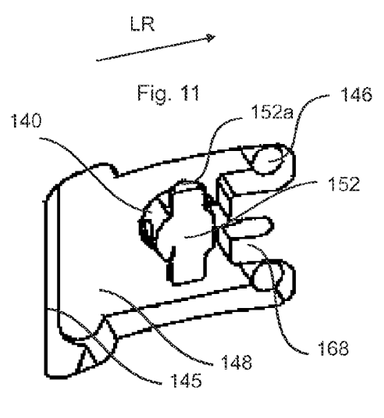
FIG. 11 is an enlarged illustration of an area of the blow mould carrier shell part shown in FIG. 10.
Figure 13:
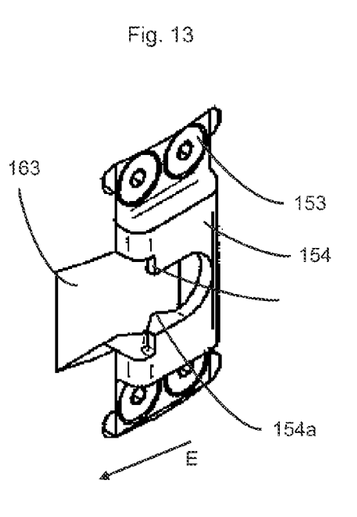
FIG. 13 is an enlarged illustration of part of the blow mould part shown in FIG. 12.

FIG. 11 is an enlarged illustration of the coupling region in the recess 148. It is evident that the holding element 152 has a semicircular or V-shaped cross-section 152a with which it can engage behind the projection 154a of the holding element 154 shown in FIG. 13. In addition, a nib or projection 168 is provided which engages in a corresponding recess 172 which is provided on the blow mould part 4a, in order to centre the blow mould carrier part. The stop 146 is additionally used for the correct positioning of the blow mould part 4a in the blow mould carrier shell 70a. In this way, a displacement of the blow mould part 4a with respect to the blow mould carrier shell part 70a in the longitudinal direction LR is prevented.

FIG. 12 is an illustration of a blow mould part 4a. This blow mould part has in this case the second holding element 154 which co-operates with the first holding element 152. The reference number 157 relates to a peripheral wall of the blow mould part 4a which abuts against the wall 142 of the blow mould carrier shell part in an assembled state. As a result of this flat contact between the walls 142 and 157 a heat transfer is also made possible, so that the blow mould part 4a itself can also be tempered indirectly with the aid of the temperature connections 162 and 164.

The holding element 154 has a projection 154a which in an assembled state [of the] blow mould part is used for a blow mould carrier shell part in such a way that the fixed holding element 152 can no longer be moved with respect to the second holding element 154. In addition, it will be seen that the second holding element 154 is made projecting with respect to the wall 157. The first holding element 152 can thus engage in the second holding element 154. The reference numbers 153 relate to fastening means, such as for example screws, which are recessed with respect to the wall 157 and by which the holding element 154 is arranged on the blow mould part 4a. The reference number 163 designates a further recess in the wall 157 which facilitates an insertion of the first holding element 152 into the second holding element 154.

The recess 163 extends at least also in the direction E in which during assembly the blow mould part is moved or rotated with respect to the blow mould carrier shell part 70a, i.e. in particular in a peripheral direction of the blow mould part 4a.

Figure 14:
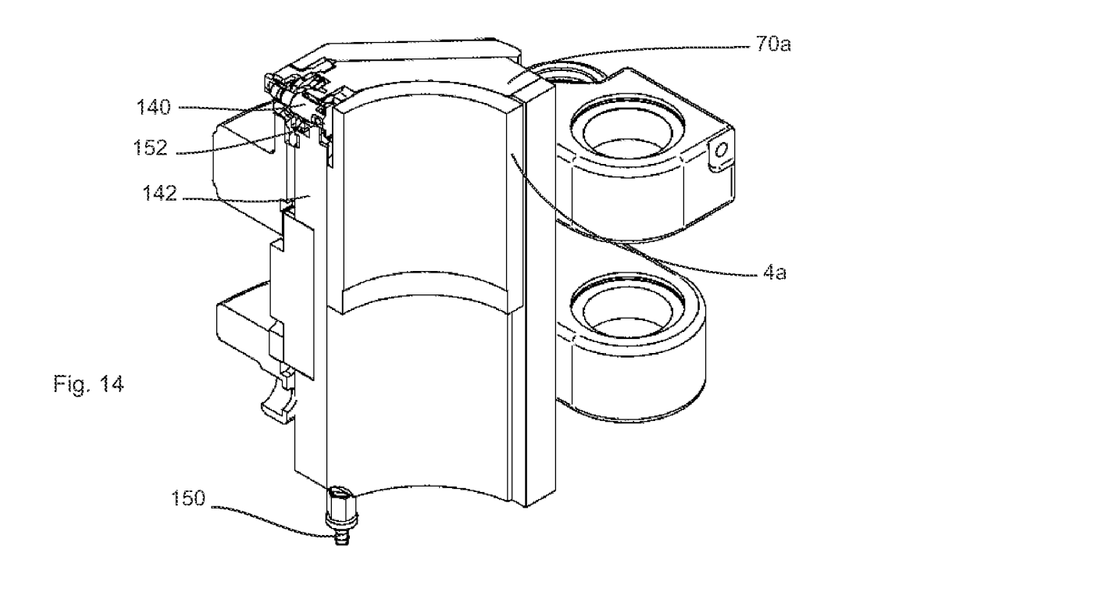
FIG. 14 is a sectional illustration to explain the holding device.

FIG. 14 is a sectional illustration of a blow mould part 4a mounted on the blow mould carrier shell part 70a, the holding device designated 138 as a whole also being visible. In particular, the actuating member 140, which is movable with respect to the blow mould carrier shell part 70a and which is used for clamping the blow mould part 4a to the blow mould carrier shell part 70a, may be seen. It is evident that the actuating member (140) extends through the wall 142 of the blow mould carrier shell part 70a. In addition, the first holding element 152 is also visible, which engages behind the second holding element arranged on the blow mould part. The reference 6a relates to the blow mould carrier part on which the blow mould carrier shell part 70a is arranged. In this case parts of the holding device 138 also extend through a wall of the blow mould carrier part 6a, more precisely through the opening 104 shown in FIG. 7.

Figure 15:
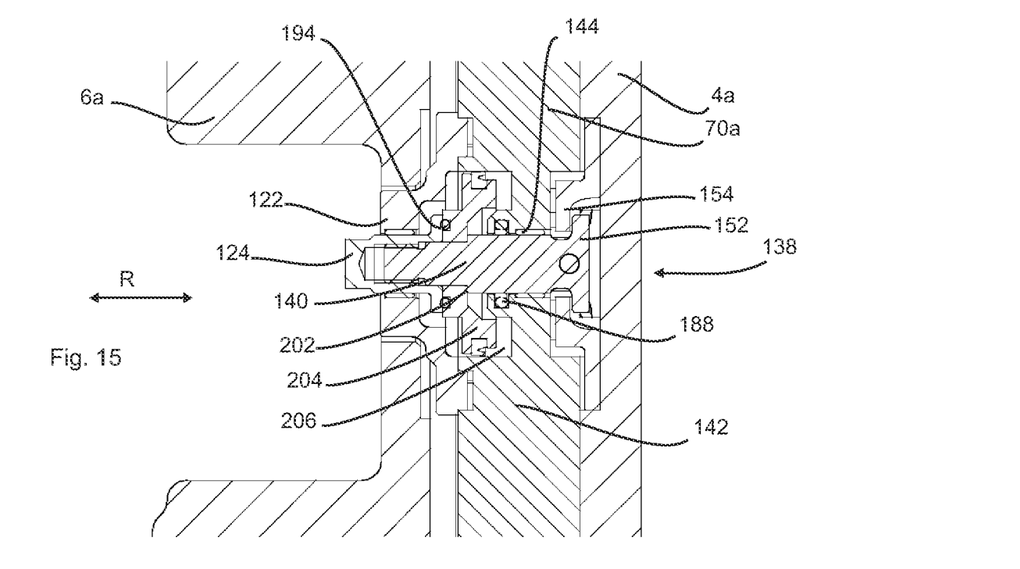
FIG. 15 is a sectional illustration of the holding device.

FIG. 15 is a sectional illustration of a holding device 138. In this case the actuating member 140 is movable in the direction R, this direction also constituting a radial direction of the blow moulds or even the container to be expanded. The actuating member 140 is guided in this case by the wall 142 through which it extends. The reference number 188 relates to a sealing device. A piston element 204 is arranged and also fixed on the actuating member 140.

The piston element 204 is arranged so as to be movable in the direction R with respect to a piston space 206. It is evident that the first holding element 152 which in this case is constructed in one piece with the actuating member 140 engages behind the second holding element 154. The second holding element 154 projects in this case into the recess 148 which is formed in the wall 142. The reference number 202 relates to a step which is formed on the actuating element 146 and with respect to which the piston element 204 is supported.

Figure 16:
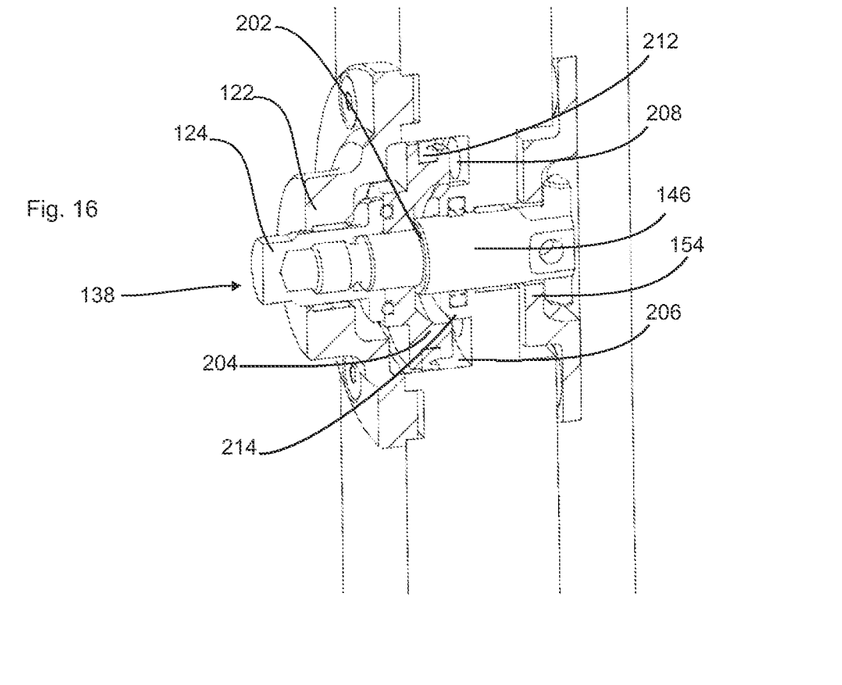
FIG. 16 is a perspective illustration of the holding device.

FIG. 16 is a perspective illustration of the holding device 138. A pneumatic medium, for example compressed air, can be supplied to the piston space 206 by way of openings 208. As a result, the piston element 204 and with it the actuating member 140 are forced towards the left and, in this way, the blow mould part 4a is pulled to the blow mould carrier shell part 70a.

The reference number 212 relates to a continuous sealing device which seals off the piston space 206. An end portion of the actuating member 140 extends in a sleeve member 124. In this case this sleeve member 124 is arranged in a fixed manner on the actuating member 140 in the direction R. The reference number 122 designates a covering device which is screwed onto the blow mould carrier shell part 70a and covers the holding device 138.

The sleeve member extends through this covering device 122.

In addition, it would be possible for a spring element to be provided which pre-stresses the actuating member 140 in the direction R or in a direction opposed to it. The reference number 214 relates to a piston plate.

Figure 17:
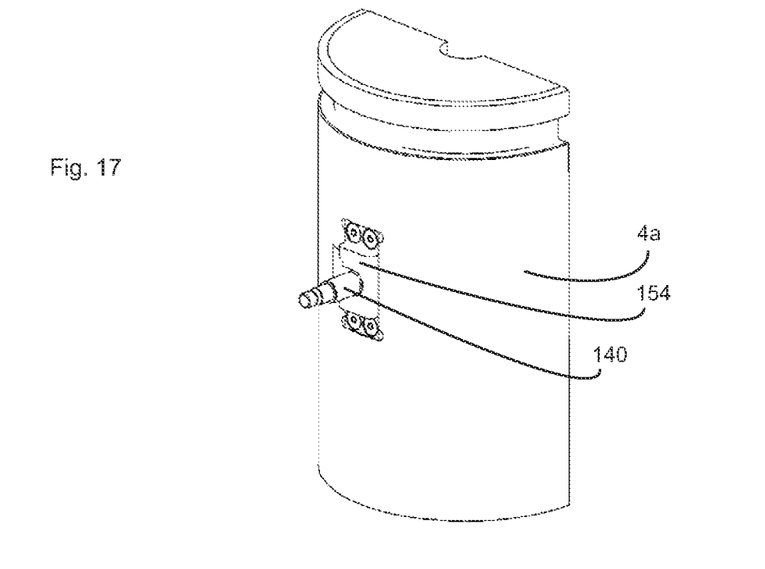
FIG. 17 is a further illustration of a blow mould part with an actuating member arranged on it.

FIG. 17 is a further illustration of a blow mould part on which the actuating member 140 is arranged for purposes of explanation, the holding element (not shown) of which engages behind the second holding element 154.

The Applicants reserve the right to claim all the features disclosed in the application documents as being essential to the invention, insofar as they are novel either individually or in combination as compared with the prior art.

The invention claimed is:

1. An apparatus for shaping plastics material pre-forms into plastics material containers with a blow mould which has at least two blow mould parts which are arranged so as to be movable with respect to each other and which in a closed state of the blow mould form a cavity, in the interior of which the plastics material pre-forms are expanded to form the plastics material containers by being acted upon with a flowable medium, comprising:
   the first blow mould part is arranged in a removable manner on a first blow mould carrier shell part and the second blow mould part is arranged in a removable manner on a second blow mould carrier shell part and the first blow mould carrier shell part is movable with respect to the second blow mould carrier shell part in order to open and close the blow mould;
   a holding device is provided in order to hold at least one blow mould part on the blow mould carrier shell part associated with it;
   the holding device has an actuating member which extends through an opening formed in a wall of the blow mould carrier shell part and/or a blow mould carrier part, wherein said actuating member is movable with respect to the wall;
   a first holding element for holding the blow mould part is arranged on the actuating member; and
   at least one blow mould carrier shell part is arranged on a blow mould carrier part and a pressure pad arrangement is arranged between the blow mould carrier part and the blow mould carrier shell part,
   wherein a second holding element, which co-operates with the first holding element to fasten the blow mould part to the blow mould carrier shell part, is fastened to the blow mould part, wherein the second holding element projects with respect to the wall of the blow mould part, and
   wherein two pressure pads are arranged at a distance from each other by continuous seals and which exert force components that are oriented at a pre-set angle relative to each other upon the blow mould or the carrier shell for the blow mould respectively.

2. The apparatus according to claim 1, wherein the movement of the actuating member with respect to the wall is produced by a flowable medium and, in particular, in a pneumatic manner.

3. The apparatus according to claim 1, wherein a connection for a flowable medium is provided on at least one said blow mould carrier shell part.

4. The apparatus according to claim 1, wherein the actuating member has a piston configured for being acted upon by a pressure medium.

5. The apparatus according to claim 1, wherein the opening is situated in a recess formed in the wall.

6. The apparatus according to claim 1, wherein in a fixed state of the blow mould part on the blow mould carrier shell part a holding element engages behind the second holding element.

7. The apparatus according to claim 1, wherein a relative movement of a blow mould part with respect to the blow mould carrier shell part holding this blow mould part is made possible in at least one state despite the engagement of the holding elements one in the other.

8. The apparatus of claim 1 wherein the pressure pad arrangement has a first pressure pad device and a second pressure pad device which are separated from each other at least in part or locally respectively.

9. The apparatus according to claim 1, wherein by means of the pressure pad arrangement the two blow mould parts can be pressed against each other during the expansion procedure and, in this way, a contour of the containers can be improved.

10. The apparatus according to claim 1, wherein the apparatus comprises a first locking element and a second locking element and wherein the second locking element engages into the first locking element for locking the blow mould during the expansion procedure.

11. The apparatus according to claim 1, wherein the actuating member has a piston capable of being acted upon by a pressure medium.

12. The apparatus according to claim 1, wherein the second holding element is connected in a rigid manner to the blow mould part.

13. The apparatus according to claim 7 wherein the relative movement of the blow mould part with respect to the blow mould carrier shell part is only possible in a loosened state of the holding device, but not in a state fastened or mounted in a fixed manner.

14. The apparatus according to claim 1 wherein the blow mould part is first applied to the blow mould carrier shell part and then rotated with respect to the latter and in this rotated state the blow mould part is locked in a fixed manner by the actuating member.

15. The apparatus according to claim 1, wherein the pressure pad arrangement is designed in such a way that a force acting between the blow mould carrier part and the blow mould part has a first force component which acts in a first pre-set region in a peripheral direction of the blow mould part and a second force component which acts in a second pre-set region in the peripheral direction of the blow mould part and wherein the first region and the second region being arranged at a distance from each other and the directions of the first force component and the second force component extending at an angle different from 0 degrees with respect to each other.

16. The apparatus according to claim 15, wherein the first force component acts in the first pre-set region, which is preferably capable of being spatially defined or bounded respectively in the peripheral direction of the blow mould part.

17. An apparatus for shaping plastics material pre-forms into plastics material containers with a blow mould which has at least two blow mould parts which are arranged so as to be movable with respect to each other and which in a closed state of the blow mould form a cavity, in the interior of which the plastics material pre-forms are expanded to form the plastics material containers by being acted upon with a flowable medium, comprising:
- the first blow mould part is arranged in a removable manner on a first blow mould carrier shell part and the second blow mould part is arranged in a removable manner on a second blow mould carrier shell part and the first blow mould carrier shell part is movable with respect to the second blow mould carrier shell part in order to open and close the blow mould;
- a holding device is provided in order to hold at least one blow mould part on the blow mould carrier shell part associated with it;
- the holding device has an actuating member which extends through an opening formed in a wall of the blow mould carrier shell part and/or a blow mould carrier part, wherein said actuating member is movable with respect to the wall;
- a first holding element for holding the blow mould part is arranged on the actuating member; and
- at least one blow mould carrier shell part is arranged on a blow mould carrier part and a pressure pad arrangement is arranged between the blow mould carrier part and the blow mould carrier shell part, wherein the blow mould part is first applied to the blow mould carrier shell part and then rotated with respect to the latter and in this rotated state the blow mould part is locked in a fixed manner by the actuating member; and wherein two pressure pads are arranged at a distance from each other by continuous seals and which exert force components that are oriented at a pre-set angle relative to each other upon the blow mould or the carrier shell for the blow mould respectively.

18. The apparatus for shaping plastics material preforms into plastics material containers, according to claim 17, wherein the pressure pad arrangement has a first pressure pad device and a second pressure pad device which are separated from each other at least in part or locally respectively.

\* \* \* \* \*